United States Patent [19]

Harbs

[11] 4,302,486
[45] Nov. 24, 1981

[54] METHOD OF SOLVENT COATING WITH GRAVURE ROLL IN COMBINATION WITH SHEATHED ELASTOMERIC ROLL AND APPARATUS

[75] Inventor: Warren F. Harbs, Mission Viejo, Calif.

[73] Assignee: Burroughs Corporation, Detroit, Mich.

[21] Appl. No.: 76,371

[22] Filed: Sep. 17, 1979

Related U.S. Application Data

[63] Continuation of Ser. No. 973,927, Dec. 28, 1978, abandoned.

[51] Int. Cl.³ .............................................. B05D 5/12
[52] U.S. Cl. .................................... 427/128; 29/129.5; 29/132; 118/212; 118/249; 118/262; 427/428
[58] Field of Search .............. 118/262, 249, 211, 212, 118/15; 29/129.5, 132; 427/128, 428

[56] References Cited

U.S. PATENT DOCUMENTS 2,765,766  10/1956  Davis et al. ........................ 118/204
3,951,102  4/1976  Allen .................................. 118/249

Primary Examiner—Bernard D. Pianalto
Attorney, Agent, or Firm—John J. McCormack; Nathan Cass; Kevin R. Peterson

[57] ABSTRACT

A preferred embodiment applies ultra-thin solvent base coatings to tape substrates with a "gravure roll" and associated elastomeric applicator roll, the applicator roll being sheathed by a flexible, solvent-resistant sleeve.

22 Claims, 4 Drawing Figures

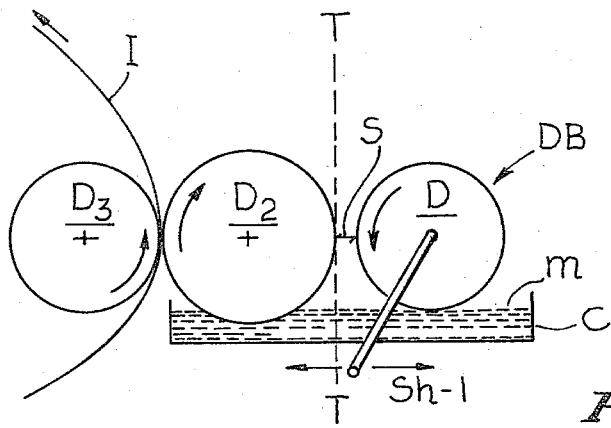
Fig. 1
PRIOR ART
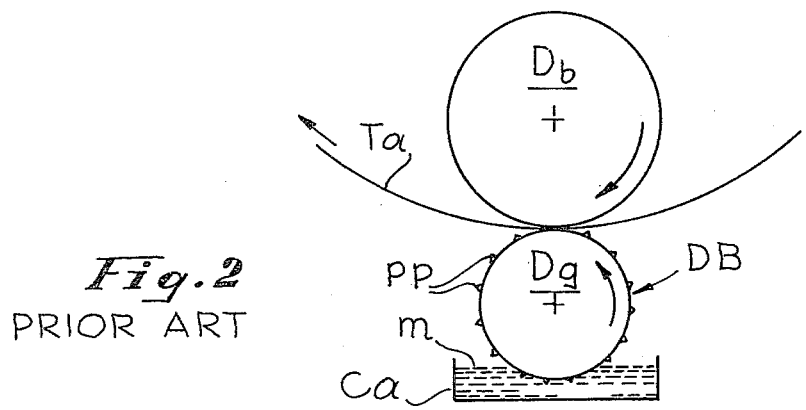
Fig. 2
PRIOR ART
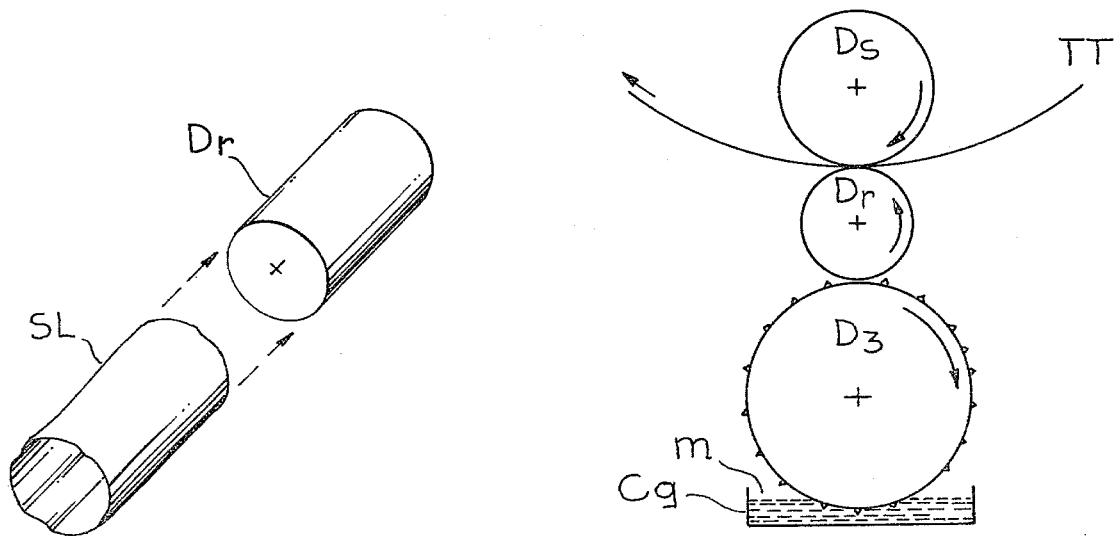
Fig. 3
Fig. 4

METHOD OF SOLVENT COATING WITH GRAVURE ROLL IN COMBINATION WITH SHEATHED ELASTOMERIC ROLL AND APPARATUS

This is a continuation of application Ser. No. 973,927, filed Dec. 28, 1978, abandoned.

FIELD OF INVENTION

An improved arrangement of "coating-rolls" for applying thin coatings to a substrate web, such as a strip of tape;—this to be done using techniques that optimize uniformity.

BACKGROUND OF THE INVENTION

Workers in the art of making and/or using web substrates having a thin surface coating are aware that it gets increasingly difficult to maintain a high degree of coating uniformity as thickness decreases. For instance, with magnetic recording tape or with floppy disks cut therefrom, it is becoming increasingly important to provide "ultra-thin" magnetic recording films (on the order of 1 micron thick or less; yet, it is extremely difficult, and relatively costly, to make such "ultra-thin" coatings truly uniform (in the sense understood in precision magnetic recording). It is an object of this invention to answer this need.

Prior Art: "Paired Metal Roll" array; FIG. 1:

FIG. 1 indicates, very schematically, a technique for applying a thin film coating of magnetic oxide to a magnetic recording tape substrate T (e.g., a polyethylene teraphthalate tape) using a "paired metal roll" delivery arrangement known in the art. That is, a known liquid base magnetic oxide coating mixture m (e.g., slurry of iron oxide particles in organic carrier) is taken up from a suitable storage vessel C and applied to moving web substrate T in a prescribed controlled manner to yield a thin coating, with thickness uniformity being rather precisely controlled (hopefully)—e.g., an oxide film of several hundred microns or less to be applied to tape for use in precision magnetic recording. Such a coating operation may be understood as here carried-out by a pair of metal coating rolls, $D_1$, $D_2$, with $D_2$ functioning as the "applicator roll" (delivering mix m from vessel C to tape T) and $D_1$ serving as "trimmer", while an associated roll $D_3$ drives the tape.

More particularly, a first, rigid metal-surfaced (e.g., steel) applicator roll $D_2$ is continually rotated and, as indicated in FIG. 1, is positioned to dip into mix m in container C, then pick-up a surface deposit of the mix and carry it past trimmer roll $D_2$, to coat substrate T. $D_2$ will therefore be understood as rotationally swept, at a prescribed surface velocity, past a prescribed "transfer site" P-1—here identified as the intersection of the surface of drum $D_2$ with reference "trim-plane" T—T, tangent to $D_2$—whereat the deposit is "trimmed" by $D_1$ to control deposit-thickness.

Similarly, companion rigid, metal-surfaced, trim roll $D_1$ is counter-rotated past $D_2$, near the same point of tangency, P-1, but separated therefrom (i.e., plane T—T) by a prescribed "trim-space" S as mentioned below. Roll $D_1$ is counter-rotated at roughly the same surface speed as $D_2$, to be swept, opposingly, past the surface of roll $D_2$, close enough to effect a thickness-control of the deposit on roll $D_2$, spacing S being adjusted to control the deposit thickness and this controls the thickness (and thickness-uniformity) of the film transferred onto passing substrate web T, as understood in the art. Roll $D_1$ is provided with a doctor blade DB, or similar arrangement, for conventionally wiping its surface clean of any deposit of mix m and returning the mix to vessel C below.

Web T will be understood as driven past roll $D_2$ (i.e., past the "coating-site" P-2 whereat mix m is transferred to web T) by suitable resilient-surface drive roll $D_3$ (preferably covered with rubber or a like elastomer to accommodate a resilient, transfer-engagement against the web and roll $D_2$), pressing web T firmly against the rigid surface of roll $D_2$ as known in the art. Web T may be, essentially, endless and of any convenient width (e.g., 6"-48" widths are well known in the magnetic tape art) and driven at a relatively conventional rpm (100–1000 ft./min. surface-speed preferred here for rolls $D_1$, $D_2$ and $D_3$).

The constituents of mix m will be known in the art—e.g., magnetic recording oxide particles in an organic vehicle like acetone, methyl ethyl ketone (MEK), a tetrahydro-furan (THF) methyl iso-butyl ketone (MIBK) or cyclohexanone. Variations in solvent concentration can be very troublesome; e.g., leading to difficulty in maintaining uniform coating thickness (such as when solvent concentration changes because of evaporation under extended use in a warm environment).

Workers are aware that, with such a coating arrangement, the thickness of the coating carried (past roll $D_1$) on roll $D_2$ will, in turn, determine the thickness of the coating delivered to substrate T—and that this thickness (on the surface of $D_2$) is, in turn, determined by such factors as: mix characteristics (e.g., viscosity, percent solvent, etc.), relative velocities of drum surfaces $D_1/D_2$, and, particularly, by the magnitude of inter-drum trim-spacing S. Spacing S may be controlled, conventionally, by shifting the position of roll $D_1$ toward or away from roll $D_2$ as indicated in FIG. 1 (see the arrows extending from associated drum-shaft SH-1. This spacing would typically vary between 100 u-in. and 1000 u-in; i.e., 100–1000 microinches).

One serious problem in maintaining the uniformity of such ultra-thin coatings stems from unwanted, or uncontrolled, variations in trim-spacing S, ("ultra-thin" coatings being understood as having a highly-uniform thickness, on the order of from less than about 1 micron to about 100 microns or more). These variations can, at times, extend entirely along the length of the interface between the rolls $D_1$, $D_2$ (e.g., as caused by an unintended taper along one or both rolls $D_1$, $D_2$, or by imperfections or wear in the roll mounts—e.g., worn bearings or by lack of perfect concentricity between roll shaft and outer surface).

Workers will also recognize that it is virtually impossible to eliminate all such spacing anomalies, practically speaking. The present invention is directed toward an improved roll arrangement for applying such coating materials—improvements which eliminate, or at least ameliorate, such coating thickness anomalies.

Prior Art: "Gravure-rolls"; FIG. 2:

FIG. 2 illustrates, very schematically, a second known arrangement for applying such coating mixtures to tape or like web substrates: i.e., a "gravure roll" array (or "Offset Gravure"), typically involving an engraved applicator roll and an "anilox" (or driver) roll as known in the art.

Such a "gravure roll" is illustrated at $D_g$ and will be understood as having a "ridged surface", with steel bars, or a like pattern of rigid dikes (PP) protruding from the roll surface as an array of surface ridges and intervening depressions—the depressions being adapted to pick up, and retain, coating material m from a suitable associated container $C_a$. This arrangement will be understood as intended to apply coating material relatively evenly upon the surface of a passing web $T_a$, driven past by an associated drive roll $D_b$. Preferably, drive roll $D_b$ is resilient-surfaced (elastomer-coated, typically) so as to press the web surface (at least slightly) into the said gravure-depressions for good contact with the mix m carried therein. A doctor blade device DB, or like leveler, is typically provided to assure that the coating material so-carried in the depressions does not rise above the (uniform) level of the ridges, as well known in the art.

Workers know that, while such a delivery system alleviates some of the problems of other systems (such as that of FIG. 1), it unfortunately generates some problems of its own; such as "streaking" and "solvent-incompatibility". By "streaking" it is meant that the coating is applied to (portions of) the web in a "striated" pattern, rather than exactly evenly and uniformly as is desired. As to "solvent-incompatibility", the need for a resilient (rubber, or other elastomeric) drive roll ($D_b$) means only that aqueous base mixtures may be so applied, since the organic vehicle in a solvent-base mixture will attack an elastomeric roll surface and soon degrade it (e.g., dissolving "pit" sites on its surface, leading to uneven contact with the web, etc.).

The present invention is adapted to improve upon such delivery system and to ameliorate, if not eliminate, associated coating problems, especially for ultra-thin solvent-base coatings.

BRIEF DESCRIPTION OF THE DRAWINGS

FIGS. 1 and 2 indicate prior art coating arrangements in schematic side view; and FIG. 4 is a like view of an embodiment of the invention, including a roll with sheath means of the type shown in the upper perspective of FIG. 3.

"Gravure/sheathed-roll" Embodiment; FIGS. 3, 4:

FIGS. 3 and 4 indicate a preferred embodiment of coating delivery rolls according to a salient feature of invention in a novel arrangement characterized by interjection of an elastomer-sheathed, resilient applicator roll between the web substrate (on its driver-roll) and a gravure roll of the type mentioned above. This is indicated schematically in FIG. 4 by sheathed roll $D_r$, between web TT (on drive roll $D_s$) and gravure roll $D_g$. Applicator roll $D_r$ will be understood as a relatively resilient (elastomeric-) surfaced (e.g., rubber-faced) roll encased by a thin resilient sleeve SL (preferably a tetra-fluoro-ethylene membrane, about 1–2 mils thick, as specified below). The resilient, chemically inert surface so-rendered will be seen as unaffected by coating chemistry (e.g., compatible with solvent coatings) and as superior in picking up coating material using the gravure depressions in gravure roll $D_g$, yet with no "streaking". The coating material is spread smoothly on the surface of applicator roll $D_r$ to be delivered to the web as ultra-thin uniform coating with none of the "streaking" or other thickness-anomalies usually seen with conventional delivery-roll arrangements.

Here, the ridged, metal surface of gravure roll $D_g$ will be understood as conventional (e.g., preferably formed of steel or the like), being adapted to pick-up a supply of mix m from associated container $C_g$ (and with doctor blade, or like leveler—not shown here). Also, the surface of drive roll $D_s$ will likewise be rigid; and preferably comprised of steel or like metal to effectively engage web TT with roll $D_r$, urging the web against (light contact) the resilient surface of the sheath-encased, rubber surfaced applicator roll $D_r$. Roll $D_r$ will be understood as engaged ("medium contact" forces) against gravure roll $D_g$ as known in the art.

Sleeve SL may be comprised of a thin, resilient, solvent-resistant material like tetra-fluoro-ethylene (alternate: poly-propylene) and may readily be fabricated as a tube or sleeve snugly fitting over roll $D_r$ as indicated schematically in FIG. 3. Such a sleeve is preferably formed from a poly-tetra-fluoro ethylene/fluorinated ethylene-propylene copolymer. Thus, sleeve SL may be drawn tightly over the elastomeric surface of drum $D_r$, and preferably be shrunk-fit snugly thereon, as well as bonded thereto, to prevent shifting during use. Tetra-fluoro-ethylene is preferred because it is so shrinkable, will readily bond securely to the rubber roll and, most of all, is chemically inert and not attacked by strong coating-solvents, like THF—whereas rubber-alone is, of course. Also, tetra-fluoro-ethylene may be surface-treated (e.g., fluorine sites removed) to present a wettable surface to the coating mix m. Further, such a sleeve may be ground-down, and so reduced in thickness for greater resilience to render a very compliant, form-following fit on the applicator roll. Further, interposition of such a resilient, sheather roll appears—rather surprisingly—to eliminate "streaking" from the gravure roll.

Preferably, and conveniently, tube SL may be readily fashioned into the hollow, relatively rugged yet flexible sleeve of conventional thickness, such as of 20 mil tetra-fluoro-ethylene stock. Then, once it is shrunk and bonded securely upon the surface of drum $D_r$, it may be ground-down to a uniform reduced thickness (such as to approximately 1 mil thickness, as preferred here), making it much more resilient and fitting snugly on roll $D_r$.

Such arrangements according to the invention will be seen as solving a number of problems. For instance, the mere interjection of a resilient roll between the gravure roll and the rigid drive roll tends to reduce, if not eliminate, the "striations", or like patterns, that a gravure roll is prone to leave on a web substrate. However, workers in the art have never conceived of doing this. Moreover, workers have disfavored elastomeric rolls in such a context—partly because they were incompatible with solvent base coating mixtures m (e.g., having strong solvents such as THF, MEK, MIBK, etc., as mentioned above)—these being notoriously quick to attack and degrade a normal elastomer. But, the provision of this flexible encasement (ensheathment) of the rubber roll surface avoids such chemical degradation, while still keeping the sheath firmly positioned and leaving the roll-surface resilient enough to effect adequate mix pick-up and proper engagement with the passing web and its rigid drive roll. That is, the ensheathment eliminates the solvent incompatibility of the rubber roll, while also accommodating "unstreaked" coating delivery from the gravure.

Moreover, such arrangements according to the invention can be readily adjusted to modify coating thickness or to accommodate environmental changes (e.g., loss of solvent, due to change in the solvent proportions from evaporation during processing) without sacrificing uniformity—for instance, one may readily change the speed ratio between applicator and gravure rolls ($D_r$ and $D_g$) to transfer greater, or lesser, coating thickness (thereafter to the substrate TT); and one can adjust the ratio of surface-speeds between applicator and drive rolls ($D_r$, $D_s$).

Conclusion:

It will be understood that the preferred embodiments described herein are only exemplary, and that the invention is capable of many modifications and variations in construction, arrangement and use without departing from the spirit of the concepts taught. As an example of further modifications, the means and methods disclosed herein are also applicable to certain other roll coating arrangements, as well as being applicable for improved application of thin films to various other, related substrates.

All variations of the invention being merely illustrative, the invention should be considered as including all possible modifications and variations coming within the scope of the invention as defined by the appended claims.

What is claimed is:

1. An improved gravure roll coating arrangement adapted to apply a thin film data recording coating to a prescribed substrate and including gravure roll means, this arrangement including:
    an ensheathed applicator roll interposed between said substrate and said gravure roll means and operatively combined therewith to transfer said film coating therebetween.

2. The combination as recited in claim 1, as adapted for ultra-thin coatings having a thickness on the order of from about 1 micron to about 100 microns.

3. The combination as recited in claim 1, wherein said applicator roll includes a resilient elastomeric surface and wherein the ensheathment is by forming a tubular sleeve of thin flexible polymeric material and fitting the tube snugly over the roll and securing it there.

4. The combination as recited in claim 3, wherein coatings are apt to be solvent based and wherein said sleeve material is relatively inert thereto and resistant to chemical degradation thereby.

5. The combination as recited in claim 4, wherein said substrate comprises magnetic recording tape, advanced past said applicator roll by relatively rigid drive means and wherein said coating comprises magnetic recording material.

6. The combination as recited in claim 5, wherein said sleeve is comprised of a poly-tetra-fluoro ethylene material a few mils thick.

7. The combination as recited in claim 6, wherein said sleeve is fashioned from stock several mils thick, fitted snugly over the elastomeric applicator roll and bonded there.

8. The combination as recited in claim 7, wherein the sleeve so secured on said applicator roll is treated to reduce its thickness to the order of about 1 mil.

9. In an improved roll coating arrangement for applying ultra-thin films of magnetic recording material to a magnetic tape substrate, the combination comprising:
    a relatively rigid drive roll adapted to advance said tape past a prescribed "application-station";
    gravure roll means adapted to efficiently transfer this magnetic recording material as a surface-deposit, from a source station to a prescribed transfer station; and
    ensheathed resilient-surfaced applicator roll means, arranged and disposed to transfer said recording material—as a surface deposit—from said gravure roll means at said "transfer station" to said tape substrate at said "application-station", as an ultra-thin film coating on the passing substrate.

10. An improved method of applying thin film coatings of a prescribed data recording coating material to a prescribed substrate comprising the steps of:
    advancing said substrate past a prescribed "coating station" in a prescribed manner;
    providing a film of said coating material on the surface of a rotating gravure roll means; and
    providing ensheathed resilient roll means between said gravure roll means and said "coating station" to transfer said coating material therebetween as a thin film coating on said substrate.

11. The combination as recited in claim 10, wherein said means are arranged to provide an "ultra-thin" coating having a relatively uniform thickness on the order of from about 1 micron to about 100 microns, and wherein said substrate comprises a tape web.

12. The combination as recited in claim 10, wherein said resilient roll means is selected and provided to include a resilient elastomeric surface; and is so ensheathed by forming a tubular sleeve of thin, flexible polymeric material and fitting this tube snugly over the resilient roll and securing it there.

13. The combination as recited in claim 12, wherein said coating material is apt to be solvent based and wherein said sleeve material is selected and provided to be relatively inert to solvent-base coating materials and to be resistant to chemical degradation thereby.

14. The combination as recited in claim 13, wherein said substrate is selected and arranged to comprise magnetic recording tape; wherein said thin film coating thereon comprises the order of a few microns; wherein said coating material constitutes magnetic recording material; and wherein said tape is advanced past said "coating station" by relatively rigid drive roll means.

15. The combination as recited in claim 14, wherein said sleeve is selected and formed to comprise poly-tetra-fluoro ethylene sheet material a few mils thick.

16. The combination as recited in claim 15, wherein said sleeve is fashioned from stock several mils thick; is fitted snugly over the elastomeric resilient roll means and is bonded there securely.

17. The combination as recited in claim 16, wherein, once said sleeve is so secured on said resilient roll it is then treated to reduce its thickness to the order of about 1 mil.

18. An improved coating apparatus adapted to deposit a prescribed ultra thin data recording coating from a prescribed supply means onto a moving web substrate, this coating including an organic solvent base, this apparatus comprising, in combination:
    gravure roll means operatively associated with said supply means and adapted to continuously rotate therein and so pickup a transfer coating thereof; and
    ensheathed applicator roll means operatively disposed between said gravure roll means and said substrate and adapted to transfer at least some of said transfer coating to the substrate; this applicator roll means comprising a resilient elastomeric surface over-fitted with a prescribed thin flexible sleeve means of polymeric material which is relatively inert to reaction with, or degradation by, said solvent base.

19. The combination as recited in claim 18, wherein said sleeve means is selected and formed to comprise poly-tetra-fluoro ethylene sheet material a few mils thick.

20. The combination as recited in claim 19, wherein said sleeve means is fashioned from stock several mils thick; is fitted snugly over the elastomeric resilient surface of the applicator roll means and is bonded there securely.

21. The combination as recited in claim 20, wherein, once said sleeve means is secured on said resilient roll it is then treated to reduce its thickness to the order of about 1 mil.

22. The combination as recited in claim 21, wherein said substrate is selected and arranged to comprise magnetic recording tape; wherein said thin film coatings is on the order of a few microns thick; wherein said coating material constitutes magnetic recording material in a solvent vehicle; and wherein said tape is advanced past the applicator roll means at the "coating station" by relatively rigid drive roll means.

* * * * *